Sept. 9, 1958

E. SCHASCHL 2,851,570

CORROSION TEST PROBES FOR USE WITH
CORROSION TESTING APPARATUS
Filed March 1, 1956

INVENTOR.
EDWARD SCHASCHL
BY
ATTORNEY

United States Patent Office 2,851,570
Patented Sept. 9, 1958

2,851,570

CORROSION TEST PROBES FOR USE WITH CORROSION TESTING APPARATUS

Edward Schaschl, Crystal Lake, Ill., assignor to The Pure Oil Company, Chicago, Ill., a corporation of Ohio Application March 1, 1956, Serial No. 568,906

2 Claims. (Cl. 201—63)

This invention relates to improved corrosion test probes for use with corrosion testing apparatus and more particularly relates to corrosion test probes possessing increased rigidity, durability, and physical strength in the form of a ceramic core, containing imbedded lead wires and on which strips of metal to be tested have been deposited by electrolytic or printed circuit methods. The invention comprises broadly improved corrosion test probes for use with the corrosion testing apparatus shown and described in copending application by G. A. Marsh and E. Schaschl, entitled "Apparatus for Determining the Influence of Corrosion on Metallic Materials of Construction," Serial Number 528,032, filed in the United States Patent Office on August 12, 1955. The corrosion test probes of this invention are designed to be used as the sensing elements for the corrosion testing apparatus disclosed in the aforesaid copending application, the entire description of which is hereby incorporated by reference.

According to said copending application, the corrosion test probes used comprise two test specimens of the metallic material of construction under consideration and for which rates of corrosion are to be determined, mounted on a suitable base member adapted to be installed in the wall of the piece of apparatus within which the corrosive environment exists. One test specimen is unprotected and exposed to the corrosive environment under the actual conditions imposing on the metallic material or materials for which corrosion rates are to be determined. The second test specimen is encased in a protective coating, such as an epoxy resin exemplified by Armstrong adhesive A-2, which isolates it from the corrosive environment to prevent its being corroded. These two test specimens are electrically connected in series to low resistance leads which are in turn interconnected to the measuring apparatus, located at a convenient place for taking the measurements. The series-connected test specimens comprise one resistance branch of an electrical bridge circuit. The other resistance branch is within the measuring apparatus. The currents from the test probes or sensing elements, comprising the two test specimens, are transmitted to an amplifying circuit which is suitably connected to the bridge circuit. The measuring apparatus, not constituting a part of this invention, takes this amplified signal into a phase-detecting and measuring network through a gain control. The resultant signal is impressed on the grid element of a vacuum tube functioning as a grid-controlled rectifier. Direct reading of the corrosion rate of the unprotected test specimen is visibly manifested by a 0-100 microammeter. For a continuous record of the corrosion weight loss, a suitable strip-chart recording potentiometer is included in the circuit, such as the Leeds & Northrup instrument designated as the Speedomax Model No. 69800-Q1-742. Variable power for the various circuits of the apparatus is provided by a suitable power source included in the instrument.

The fabrication of the corrosion probes in combination with the insulated base member for use in said copending application may be accomplished by hand. The test specimens may be mounted in bull plugs and after connection in series it is necessary to coat one specimen with a protective coating to complete the probe. A plastic shield may be provided to protect the thin steel ribbons of the test specimens from the direct impact of the flowing stream of corrosive atmosphere without interfering with the exposure of the specimen. The rigidity, durability and physical strength of such probes are dependent on the characteristics of the test specimens being tested. The test specimens are in the form of metal foil ribbon or wire and as such are subject to bending and breaking, and in many instances have been found inadequate for use outside the laboratory. To this end and as part of the invention herein, test probes are provided, which may be fabricated in large numbers on a production basis, having increased physical strength and consequent usefulness.

It becomes then a primary object of the invention to provide improved corrosion test probes for corrosion studies of metallic materials of construction.

Another object of the invention is to provide corrosion test probes which are easily fabricated and have increased physical strength and usefulness.

A third object of the invention is the provision of corrosion test probes built around a ceramic or other suitable core containing imbedded lead wires connected to plated or printed test specimens attaching to the outside of said core.

These and other objects of the invention will become apparent as the description thereof proceeds. The invention is best described by reference to the drawings in which.

Figure 1:
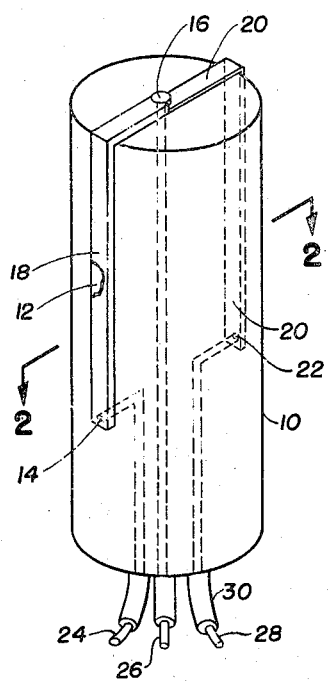
Figure 1 is an isometric projection showing the use of metal strips plated or printed out on the surface of an insulating core to form the test specimens.
Figure 2:
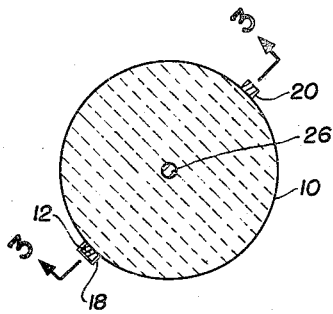
Figure 2 is a cross-section taken along lines 2—2 in Figure 1.
Figure 3:
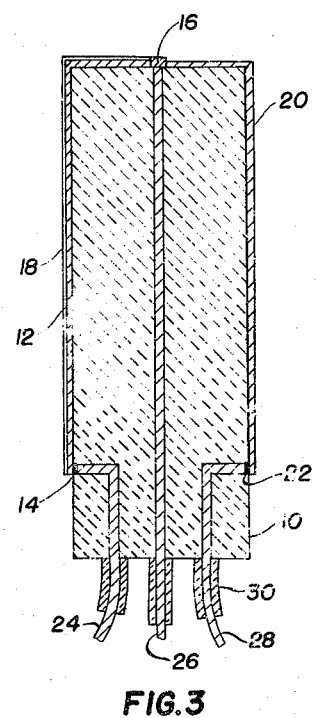
Figure 3 is a vertical, cross-sectional, plane view along line 3—3 of the embodiment shown in Figure 1.

Referring to Figures 1, 2 and 3, the numeral 10 indicates the insulating body support of the test probe, which may be in the form of a cylinder made of porcelain, or synthetic plastics and other materials to be subsequently described. Attached to the outside of the insulated body is test element 12 extending from contact 14 along the outside and across the top to contact 16. Test element 12 is covered with a protective coating 18 along the entire length between contacts 14 and 16. Coating 18, described infra, may be any material resistant to the atmosphere under test. Continuing from contact 16 across the top of the insulated body is test element 20, which extends along the back side and terminates at contact 22. Test element 20 is unprotected and is subjected to attack by the corrosive atmosphere into which the probe is inserted. At the base of the insulated body are shown three lead lines, 24, 26 and 28, the first connecting with contact 14, the second connecting with contact 16, and the third connecting with contact 22. These lead wires may be suitably insulated as indicated at 30.

Figure 4:
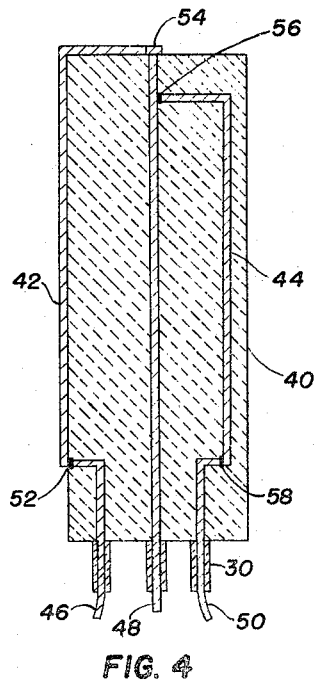
Figure 4 is a cross-sectional view of another embodiment of the invention in which one of the test elements is imbedded within the core of the probe.

In Figure 4 another arrangement of the probe is shown in cross-section in which the insulating body support, 40, carries exposed test element 42 and protected test element 44 is imbedded within the insulating body. A similar arrangement of leads 46, 48 and 50 and contact points 52, 54, 56 and 58 is used as in the previous figures.

The probe test elements, whether used in a simple bridge circuit or in a more complex direct-reading, bridge-measuring circuit as described in the aforementioned copending application, comprise a pair of metallic resistance elements serially connected and mounted on or in the insulating core shown. Both the protected, as well as the unprotected resistance elements have the same composition and resistance characteristics. It is not necessary that the probe test elements have the same physical configurations as long as their electrical characteristics are the same at the time of fabrication.

In fabricating and forming the corrosion test probes of this invention several methods and procedures may be used. To form the embodiment shown in Figures 1, 2 and 3, the insulated core is first formed with its lead wires imbedded therein and the contact points exposed as shown. The insulating core may be formed of any non-conductive or dielectric material which has the property of resisting the flow of current or electrical charge therethrough e. g., such materials as ebonite, glass, mica, paper, rubber, flints, feldspars, beryl, granite, leucite, marble, quartz, silica, zirconia and zircon. Refractory materials such as fire-clay, fused silica, silicon carbide and unburned magnesite may be used. Various plastics such as molded and laminated phenolic resins, urea-formaldehyde resins, cellulose nitrate, cellulose acetate, vinyl resins, styrol resins and resins derived from rubber may be used as long as they have the properties of good electrical resistivity, tensile strength, hardness and resistance to abrasion or corrosion. The core itself may be formed by molding, fusion, baking or extrustion.

After the core has been prepared with the lead wires in place, the electrical resistance or test elements 12 and 20 are formed. To accomplish this the first step is the application of strips of an electrically conducting paint, such as graphite, on the surface of the core extending between the contact points as shown in Figure 1. These painted strips are the foundation for the deposition of the test elements and are made as wide and as long as desired, depending on the dimensions of the test elements. The test elements of metal to be tested are then electrolytically plated or deposited onto the painted strips to the desired thickness. For this purpose it is preferred that the metal layers have a thickness which is 5% or less of the width thereof and more preferably 1% or less of the width. If thicker test specimens are used, corresponding losses in accuracy result or unwieldy corrections must be used. In general, the thickness of the test metal used for the corroding test element or specimen is chosen in such a way that there will be an appreciable fraction of metal lost through corrosion during the desired test period. For example, if the desired test period is a day or less, the thickness may be 0.0005 to 0.001 inch. If the test period is to be one week, the test specimen thickness may be 0.005 to 0.01 inch. The latter thickness is about the greatest that can be used in the apparatus shown and described in the aforesaid copending application.

After depositing the metal test element on the painted surface, the non-corrodible, non-conducting material, 18, is applied to one test element and the entire core assembly is mounted on a supporting base (not shown), as a bull-plug. The non-conducting material, 18, which may be the same as coating 30 on the lead wires, which latter may extend over all the portions of the lead wires within the core itself, may be any type of protective coating having good insulating properties and good corrosion-resisting properties. Suitable examples of such materials include such proprietary compounds as Tygon paint (American Chemical Paint Co., Ambler, Pa.); Armstrong A–2 adhesive; Carbolene Phenoline 300; Scotchcast Resin-MMM; Sauereisen cement, which is desirable for high temperature applications; fluorinated ethylene polymers such as Kel-F, Teflon, polyethylene (these would have to be flame-sprayed); or any corrosion-resistant, relatively non-conducting coating. These and other plastic materials of construction are described in detail in "Modern Plastics Encyclopedia," vol. 33, No. 1A, 1955, published by Plastics Catalogue Corp. of Bristol, Connecticut. The plastics properties chart accompanying this publication gives the physical, chemical, electrical, molding and other properties of numerous plastics, and their trade names, that may be used.

The coating should be of sufficient thickness to provide complete protection to the coated resistance element both during the test life of the corrosion testing unit or probe and during handling or storage. The coating may be applied by spraying, dipping, brushing, etc., amenable to the particular coating chosen.

In fabricating the probe test element shown in Figure 4, the material for core 40 may be placed in a suitable mold with leads 46, 48 and 50 in place and with test element 44 suitably connected. The mold is then heat-treated so solidify or otherwise form same into a concrete solid mass. Next, contact points 52 and 54 are cleaned and test element 42 applied by painting or electro-chemical deposition, until it is approximately the same size and has the same electrical properties as the buried element, 44. After fabrication the probe can be tested in an electrical circuit to establish that the electrical properties are the same. Element 44 may be a thin foil-strip of the material of construction under consideration while element 42 may be a painted or printed strip of the same material or a similar foil-strip adhesively applied to the insulating body.

The resistance elements may be prepared from any solid, electrically conductive material, the selection of which will depend upon the type of system being studied. They may be the same material as that from which the vessel, conduit, tower, or other unit exposed to the corrosive environment was manufactured. However, they may constitute other metallic materials of construction whose corrosibility is under consideration.

In fabricating the corrosion test probes of this invention, the insulating and supporting core may be made from such materials as the paper and fabric laminates used in printed circuitry, such as XXPhenolic, XXPPhenolic, XXXPhenolic, XXXPPhenolic, and epoxy resin laminates, where the maximum operating temperature of the test probe does not exceed about 250° F. These materials, described in Materials and Methods, vol. 42, No. 1, July 1955, exhibit good metal bonding strength, flexing strength, and arc resistance, and are of low cost. The maximum temperature at which these materials may be joined is about 400° to 450° F. with a time of heating not more than about 5 seconds. The maximum operating temperatures for glass fiber laminates are; melamine, 260° F.; silicone, 300° F.; polystyrene, 170° F.; polyester, 250° F.; Teflon 300° F.+; and epoxy 250° F.+, but the binding temperatures are higher and the dimension stability is improved over paper and fabric laminates. Phenolic nylon fabric laminates would have only limited application, since the maximum operating temperature during fabrication or use is only about 165° F. Ceramic insulators such as titanite, steatite, glass-bonded mica, and glass-bonded synthetic mica withstand high temperatures and high frequencies. The latter-named mica inorganic materials can be used or fabricated at temperatures as high as 650° to 750° F.

The printed circuitry techniques which have been developed and which are being presently improved that may be used to apply the test elements to the insulating core include etched wiring, painted wiring, plated wiring, embossed wiring, stamped wiring and metal powder or sprayed metal processes. In the etch-wiring technique, the core is clad with a coating or strip of metal of the type to be tested. An etch-resistant coating is then applied over the metal coating and an acid solution is used to etch away the unwanted metal. Holes may be punched to form the contact points within the core and electroplating used to form plated-through holes to increase the adherence of the metal test specimen to the core. The painted wiring process uses a conductive ink formed with a powder of the metal under consideration in a thermosetting binder. A mash or stencil is used to aid in applying by hand-brushing, spraying or machine application, the strip of resistance element to the surface of the core. Where the metal to be tested in the corrosive environment is Zn, Cr, Fe, Cd, Co, Ni, Sn, Pb, Cu, etc., coatings thereof may be placed upon the metal clad core element in appropriate strips by electroplating by passage of a current through an electrolytic salt of the metal. Metals high in the electrochemical series cannot be deposited from an aqueous solution. Provision may be made for plated-through holes or eyelets as contact points to provide a mechanical bond to the core. After the electroplating is finished the excess clad metal can be trimmed away. Compensation in the electrical circuit is made for the presence of the clad metal in determining the rate of corrosion.

The embossed wiring technique comprises pressing a metal foil, either coated with thermal and chemical resistant adhesive or utilizing a separate sheet of adhesive, into the surface of the insulating core in appropriate strips by means of a raised and heated die. The excess foil and adhesive is milled off the core, leaving a flush metal strip test element. This method has the advantage of embedding the test element into the surface of the core so that it is protected from mechanical shock. Also, the test elements may be applied to grooves in the core in the form of a powder, followed by the application of heat to sinter the metal powder into a continuous metal strip. The test elements may be applied by spraying molten metal into sunken grooves or through a suitable mesh to form the strip test elements on the surface of the core.

From the description it is apparent that the invention relates to a corrosion test probe for use in corrosion studies based on changes in electrical resistance of serially connected matched test specimens, one protected and one unprotected, composed of deposited metal particles in the form of a strip of uniform cross-section having substantially uniform composition and electrical resistance, which are attached to the surface of a non-conducting specimen holder adapted to be placed in the corrosive atmosphere under consideration. The deposited metal particles forming the thin metal strip are agglomerated by electrolytic plating, precipitation as from a metal paint, or by pressing or printing processes. The lead wires or conductors may terminate at any portion of the specimen holders in any convenient manner so that the necessary measuring circuit, including a bridge network containing the matched test specimens branch connected in parallel, may be connected thereto and accurate measurements of corrosion rates determined. Two or more test specimens may be exposed to the corrosive atmosphere from a single specimen holder or core. The test specimens need not be symmetrically placed on the specimen holder as long as they are serially connected and matched in composition, form and electrical resistance. Any shape of core or specimen holder may be used with generally tubular and cylindrical forms being preferred.

What is claimed is:

1. A corrosion test probe adapted for use in comparative corrosion studies through an electrical bridge circuit, which probe consists of an electrically non-conducting specimen holder having a base end and an elongated body portion, a thin metallic strip test specimen attached to and extending longitudinally on the outer surface of said specimen holder, an intermediate junction on said test specimen dividing same into two portions having substantially identical thickness, electrical resistance and composition, a protective coating over the surface of one of said portions of said specimen to protect same from corrosion, said holder being so located that a substantial part of the elongated body portion thereof is between the protected and unprotected portions of said test specimen, three spaced electrical conductors imbedded in insulated relationship within the body of said specimen holder and protruding from the base end thereof, one of said conductors being connected to said intermediate junction, the other conductors being connected to the ends of said test specimen.

2. A corrosion test probe adapted for use in comparative corrosion studies through an electrical bridge circuit, which probe consists of an electrical non-conducting specimen holder having a base end, a top end and an elongated body portion, a first unprotected metallic strip test specimen attached to and extending longitudinally on the outer surface of said elongated body portion of said specimen holder, one end of said first test specimen being near said base end and the other being at said top end, a second metallic strip test specimen imbedded and extending longitudinally within said elongated body portion so as to protect same from corrosion, said first and second test specimens having substantially identical thickness, electrical resistance and composition, three spaced electrical conductors imbedded in insulated relationship within the elongated body of said specimen holder and protruding from the base end thereof, one of said conductors being connected to said first test specimen at said top end of said specimen holder and also being connected to said second test specimen at a point near said first connection, the other conductors being connected to the remaining ends of said first and second test specimens.

References Cited in the file of this patent

UNITED STATES PATENTS

| 2,583,930 | Cotton | Jan. 29, 1952 |
| 2,735,754 | Dravnicks | Feb. 21, 1956 |

UNITED STATES PATENT OFFICE
CERTIFICATE OF CORRECTION

Patent No. 2,851,570     Edward Schaschl     September 9, 1958

It is hereby certified that error appears in the printed specification of the above numbered patent requiring correction and that the said Letters Patent should read as corrected below.

Column 4, line 17, for "so solidify" read -- to solidify --; column 6, line 17, before "specimen" insert -- test --; line 18, before "holder" insert -- specimen --.

Signed and sealed this 2nd day of December 1958.

(SEAL)
Attest:

KARL H. AXLINE
Attesting Officer

ROBERT C. WATSON
Commissioner of Patents